(No Model.)

T. A. MILLER.
CHURN DASHER.

No. 255,319. Patented Mar. 21, 1882.

Witnesses:
H. C. McArthur.
John C. Kilty.

Inventor,
Thomas A. Miller.
per Chas. H. Fowler
Attorney.

UNITED STATES PATENT OFFICE.

THOMAS A. MILLER, OF GRENOLA, KANSAS.

CHURN-DASHER.

SPECIFICATION forming part of Letters Patent No. 255,319, dated March 21, 1882.

Application filed October 20, 1881. (No model.)

*To all whom it may concern:*

Be it known that I, THOMAS A. MILLER, a citizen of the United States, residing at Grenola, in the county of Elk and State of Kansas, have invented certain new and useful Improvements in Churn-Dashers; and I do hereby declare that the following is a full, clear, and exact description of the same, reference being had to the annexed drawings, making a part of this specification, and to the letters and figures of reference marked thereon.

Figure 1:
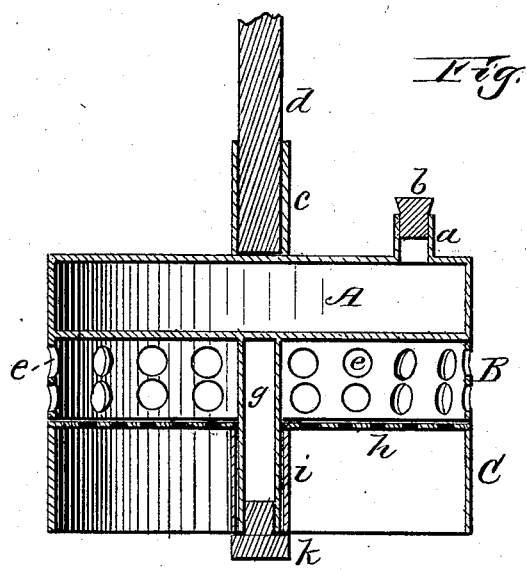
Figure 2:
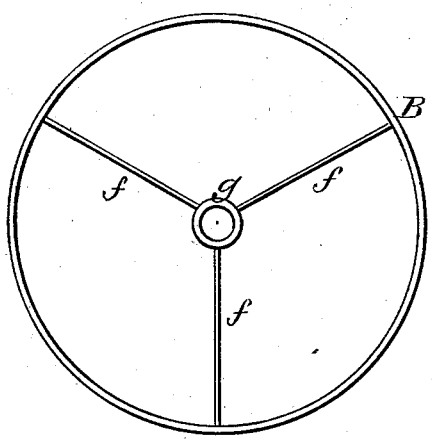

Figure 1 of the drawings is a vertical section of a churn-dasher constructed in accordance with my invention, and Fig. 2 is an under plan view of the same with the lower section removed.

The present invention has relation to that class of churn-dashers provided with a receptacle for hot or cold water to temper the cream; and it consists in certain new and useful improvements in the same, as will be hereinafter described, and subsequently pointed out in the claim.

In the accompanying drawings, A represents a suitable vessel or receptacle for containing warm or cold water for the purpose of bringing the cream to the desired degree of temperature for churning, the water being introduced through a nozzle, $a$, and afterward closed by a suitable plug, $b$. This receptacle A is formed with a socket, $c$, by which the dasher is connected to a suitable handle, $d$, for operating it, and upon its under side has an annular depending rim, B, with perforations $e$ and dasher-wings $f$.

Extending downward from the under side of the vessel or receptacle A is a short tube, $g$, for convenience of connecting to the dasher an inverted pan, C, having a perforated bottom, $h$, said tube $g$ passing through a central sleeve, $i$, of the pan, the latter being held thereto by a plug, $k$. I do not, however, desire to confine myself to the above-specified means of connecting the pan C to the dasher, as various means may be employed other than those described, so long as it is properly secured in place and admitting of its being readily removed for cleaning. I prefer, however, that the pan should be secured substantially in the manner shown, or at least so as to move around a stationary axis by the vertical reciprocating motion of the dasher, as this would tend to increase the agitation of the cream. As the dasher is on its downward stroke the cream is forced against the inner sides of the pan C and through the perforated bottom $h$, and thence against the bottom of the receptacle A, the water therein tempering the cream, after which the cream is forced out laterally through the openings $e$ against the sides of the churn.

It will be seen that the peculiar construction of the dasher perfectly agitates the cream, while it is at the same time being tempered, thus greatly diminishing the labor of hand-churning, and more rapidly inducing the separation of the oily globules from the other portions of the cream.

It should be understood that the wings $f$, connected to the interior of the depending rim B, are an essential feature in this class of churn-dashers, and without the wings the successful operation of the dasher would be materially impaired. By the employment of the wings $f$ the depending flange or rim B is divided off into several chambers, as shown in Fig. 2, and the dasher, when raised through the milk, leaves these chambers to fill with air. The dasher then being forced down into the milk, the latter flows up through the perforated bottom $h$ of the inverted pan C, and also around the exterior of the depending rim B, thereby closing the perforations around the chambers formed by the wings $f$, and confining a portion of the air therein. This would not be the case were it not for the wings $f$ dividing the interior of the depending rim B into several chambers, as there would be a current of air pass through the perforations in the rim B and immediately escape; but by the wings the air is prevented from escaping and confined in the chambers, and by the downward motion of the dasher the air is gradually distributed through the milk to the bottom of the churn as the milk fills said chambers through the perforations in the rim B. The importance of the wings $f$ is therefore evident, in connection with the other parts of the churn-dasher, stopping, as it does, the current of air and retaining it in the chambers until it is gradually forced out by the inflowing milk as the dasher is on its downward stroke, thereby greatly increasing the agitating effect upon the milk and rendering churning much more effective.

Having now fully described my invention, what I claim as new, and desire to secure by Letters Patent, is—

In a churn-dasher, the water-vessel A, having perforated depending rim B, divided off into air-chambers by wings $f$, in combination with the removable inverted pan C, having perforated bottom $h$, substantially as and for the purpose set forth.

In testimony that I claim the above I have hereunto subscribed my name in the presence of two witnesses.

THOMAS A. MILLER.

Witnesses:
T. S. CUMMINGS,
D. M. REID.